United States Patent
Jahunnathan et al.

(10) Patent No.: US 11,550,307 B2
(45) Date of Patent: Jan. 10, 2023

(54) ASSET MANAGEMENT, REGISTRY, AND TRACKING ON SHARED BLOCKCHAIN NODES

(71) Applicant: Accenture Global Solutions Limited, Dublin (IE)

(72) Inventors: Senthilkumar Jahunnathan, Bengaluru (IN); Parag Pandit, Bangalore (IN); Maiby Kunjachan, Pulpally (IN); Rajendra Muthusamy, Bangalore (IN); Prashant Sahadev Sawant, Mumbai (IN); Prashant V. Kulkarni, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/003,830

(22) Filed: Aug. 26, 2020

(65) Prior Publication Data
US 2022/0066424 A1 Mar. 3, 2022

(51) Int. Cl.
*G05B 19/418* (2006.01)
*G06F 16/9035* (2019.01)
(Continued)

(52) U.S. Cl.
CPC ..... *G05B 19/4185* (2013.01); *G06F 16/9035* (2019.01); *G06Q 10/10* (2013.01); *H04L 9/0643* (2013.01); *H04L 9/50* (2022.05)

(58) Field of Classification Search
CPC .............. G05B 19/4185; G05B 19/418; G06F 16/9035; G06Q 10/10; G06Q 10/20; H04L 9/0643; H04L 2209/38
See application file for complete search history.

(56) References Cited

U.S. PATENT DOCUMENTS 10,102,526 B1 * 10/2018 Madisetti ............. G06Q 20/389
10,755,226 B1    8/2020 Robyak et al.
(Continued)

FOREIGN PATENT DOCUMENTS

EP          3564881 A1     11/2019
WO    WO-2018090331 A  *  5/2018   ......... G06Q 20/3821

OTHER PUBLICATIONS

Qiuxiang Dong, "Attribute-Based Encryption for Fine-Grained Access Control over Sensitive Data", 2020, ProQuest Dissertations and Theses, pp. 1-145 (Year: 2020).*
(Continued)

*Primary Examiner* — Maria C Santos-Diaz
*Assistant Examiner* — Michael J. Monaghan
(74) *Attorney, Agent, or Firm* — Norton Rose Fulbright US LLP

(57) ABSTRACT

The present disclosure provides a blockchain platform having functionality that enables blockchain nodes to be shared among multiple entities while maintaining security with respect to the blockchain. Blockchain platforms of embodiments include a hash function (also referred to as a chaincode) that enables attributes to be generated and attached to user identifiers, where the attributes associate users with specific entities supported by the blockchain. For shared nodes, the attribute may be utilized, at least in part, to control access permissions to data recorded to the blockchain. Embodiments of blockchain platforms may find particular utility when applied to complex use cases involving multiple entities.

20 Claims, 4 Drawing Sheets

(51) Int. Cl.
*G06Q 10/10* (2012.01)
*H04L 9/06* (2006.01)
*H04L 9/00* (2022.01)

(56) References Cited

U.S. PATENT DOCUMENTS

| | | | | |
|---|---|---|---|---|
| 2018/0101842 | A1* | 4/2018 | Ventura | H04L 9/0841 |
| 2018/0137512 | A1* | 5/2018 | Georgiadis | H04L 63/126 |
| 2019/0020468 | A1* | 1/2019 | Rosenoer | H04L 63/08 |
| 2019/0222575 | A1* | 7/2019 | Oberhauser | H04L 63/0869 |
| 2019/0305967 | A1* | 10/2019 | Hamel | G07C 9/27 |
| 2019/0340269 | A1* | 11/2019 | Biernat | G05B 19/41865 |
| 2019/0378352 | A1 | 12/2019 | Dey et al. | |
| 2020/0005388 | A1* | 1/2020 | Lim | G06Q 30/0645 |
| 2020/0007311 | A1* | 1/2020 | Oberhofer | H04L 9/3297 |
| 2020/0034454 | A1* | 1/2020 | Chamarajnager | H04W 4/35 |
| 2020/0242212 | A1* | 7/2020 | Gibb | H04W 12/08 |
| 2020/0250295 | A1* | 8/2020 | Padmanabhan | H04L 67/104 |
| 2020/0320211 | A1* | 10/2020 | Moore | H04L 63/04 |
| 2021/0352077 | A1* | 11/2021 | Benedetti | H04L 9/3247 |
| 2021/0390201 | A1* | 12/2021 | Adhikari | H04L 9/3239 |

OTHER PUBLICATIONS

Michael Kuperberg, "Blockchain-Based Identity Management: A Survey From the Enterprise and Ecosystem Perspective," Nov. 2020, IEEE Transactions on Engineering Management, vol. 67, No. 4, pp. 1008-1027. (Year: 2020).*

"3 Ways Blockchain Will Enhance Your Asset Management Efforts," International Business Machines, https://www.ibm.com/blogs/internet-of-things/iot-blockchain-enhances-asset-management/, last accessed Aug. 26, 2020.

"Watson IoT Platform—Overview," International Business Machines, https://www.ibm.com/cloud/watson-iot-platform, last accessed Aug. 26, 2020.

"Condition Monitoring for Industrial Assets," National Instruments, https://www.ni.com/en-us/landing/condition-monitoring.html?cid=Paid_Search-a243q000004k8S4AAI-Consideration-iot_predictive_maintenance_broad&gclid=CjwKCAjwkPX0BRBKEiwA7THxiJEky2yOFBOgp9Z2NcDkPH_gbfqwU-FubX2iFMCbhQzFFfZCESMG4RoC2gwQAvD_BwE, last accessed Aug. 26, 2020.

Bankole, K., "Track assets on a blockchain ledger—IBM Developer," https://web.archive.org/web/20200430050214/https://developer.ibm.com/components/maximo/patterns/tracking-maximo-managed-asset-transactions-across-a-business-network/, Feb. 20, 2020.

European Patent Office, Communication, Extended European Search Report issued for European Application No. 20198576.9, dated Apr. 13, 2021, 8 pages.

* cited by examiner

ASSET MANAGEMENT, REGISTRY, AND TRACKING ON SHARED BLOCKCHAIN NODES

TECHNICAL FIELD

The present application relates to blockchain systems or platforms and more specifically to blockchain platforms configured to support shared blockchain nodes.

BACKGROUND

The manufacturing industry has become increasingly distributed with many different actors (e.g., suppliers, original equipment manufacturers (OEMs), etc.) that are often distributed across different geographic regions (e.g., cities, states, countries, continents, and the like). While the distributed nature of modern manufacturing provides various advantages (e.g., reduced costs, sourcing materials close to the manufacturing site, etc.), the manufacturing industry is still faced with many problems. For example, suppliers may manufacture and supply parts, sub-assemblies, assemblies, or other components that may be used to manufacture machines or other types of equipment or devices. The OEMs may source components from multiple suppliers and combine them to produce a single machine or piece of equipment, which may then be provided to a client for use in the relevant industry.

Suppliers typically create various types of data related to the components they manufacture. For example, a supplier may generate a set of specifications for a component, test data associated with testing of the component, maintenance data, manufacture data, and performance data, which may provide various details about the component, its requirements, and proper maintenance of the component. Presently, only portions of this information may be provided to the OEM, resulting in improper operation, maintenance, and monitoring of a machine or piece of equipment that incorporates the component(s). For example, the supplier may provide the OEM with the specifications data, but may not provide the maintenance or test data. While the OEM may perform its own testing, such testing by the OEM is typically related to the finally assembled machine or equipment and cannot provide details regarding testing of any single component that is incorporated into the machine or piece of equipment. As a result, clients (e.g., entities taking possession of the machines or equipment produced by the OEMs) may operate the machines or equipment within appropriate limits specified by OEMs but those limits may not be appropriate for individual components of the machines or equipment. This can lead to unsafe environments and operating conditions, as well as reduce the lifespan of the machine or equipment.

Another problem that exists in present industry practice is the inability to monitor conditions in which machines and equipment are operated, such as the loads a machine or equipment is subjected to during operation. As a result, when an accident or failure occurs, it may be difficult to determine the cause of the failure. For example, if the supplier specifies a first load for a component provided to an OEM, where the first load is determined for the component specifically, the OEM may determine a load for the machine or equipment that incorporates the component based on testing of the machine or equipment in its finally assembled form (i.e., the OEM may not test the load bearing capabilities of the individual components). This could result in a situation where the supplier specifies a first load requirement and the OEM may specify a second (higher) load requirement that could lead to unsafe operating conditions or damage to the machine or equipment. If a failure occurs due to the component being overloaded, it may be difficult to identify the cause as being related to an improper loading of the component after the fact (e.g., because it may be difficult to isolate the cause of the failure as being related to a specific component being overloaded as opposed to the assembled machine or equipment).

Blockchain technology may provide a solution that offers a trustworthy data storage mechanism for the exemplary industrial and manufacturing examples described above—however, several challenges must be addressed by such a blockchain solution. Blockchain platforms are typically supported by a plurality of nodes deployed by the participants of the blockchain platform and deployment of such nodes may be cost prohibitive and/or technologically prohibitive to some participants (e.g., entities that lack the technical expertise to deploy blockchain nodes or cannot afford the costs of deploying and maintaining a blockchain node). Thus, while blockchain platforms provide functionality that may be beneficial to certain real world use cases, it may be difficult to implement blockchain-based solutions. An additional challenge with blockchain solutions is control over data deployed to the blockchain platform. For example, while it may be acceptable to an entity for some third parties to have access to the data the entity has recorded to the blockchain, that entity may not want all third party entities to have access to the data. Accordingly, blockchain solutions may be further complicated by the data access requirements of a particular use case. Data authenticity is another challenge that blockchain platforms face. Data recorded to the blockchain may be stored as immutable records, but blockchain technologies do not necessarily provide mechanisms that allow the author of data recorded to the blockchain to be controlled. This creates the potential for situations where data may be recorded to the blockchain by one entity in a manner that creates the appearance that the data was recorded by a different entity. In view of the foregoing deficiencies, it is to be understood that while blockchain technology may offer some advantages over other data management and storage technologies, care should be taken when creating blockchain-based solutions for real world applications to ensure that any deployed blockchain solution addresses the needs of the real world application and protects the entities participating in the blockchain platform.

SUMMARY

The present disclosure provides systems, methods, and computer-readable storage media for providing shared nodes of a blockchain platform. Shared nodes of a blockchain platform may provide blockchain functionality and services to multiple entities from a single blockchain node and may provide functionality for maintaining security with respect to data recorded to the blockchain by the entities supported by the shared node. For example, the shared node (or another node of the blockchain platform) may include hash function capabilities that may be used to generate user identifiers that may be used to associate users of the shared node with specific ones of the multiple entities supported by the shared node. The generated user identifiers may include an attribute generated using the hash function and the attribute may associate the corresponding user with a particular entity. Generating user identities in this manner may enable data written to the blockchain via the shared node to be associated with specific entities (e.g., for providing access control)

and may also be used to authenticate users when data is provided to the blockchain platform. To illustrate, when data is provided for recording to the blockchain (or when a request to access data recorded to the blockchain is received), the user identifier and attribute may be authenticated using the hash function. If the user is authenticated, the user may be granted access to the data or allowed to write data to the blockchain.

In aspects, embodiments of the present disclosure may be configured to capture information associated with the operational state of the asset in real-time or near real-time. For example, Internet of things (IoT) devices or sensors may be integrated into or embedded within the asset. These devices may be configured to monitor various aspects of the asset and record observations about the asset and its operational state to the blockchain. The recorded information may be analyzed by functionality of the blockchain platform to determine whether any problems can be identified with respect to the asset. In some instances, the blockchain may issue control signals to the asset to modify its operational state (e.g., in an effort to mitigate the likelihood of damage to the asset). In other instances, the blockchain may generate work orders that may indicate the asset should be inspected to ensure that one or more components of the asset are in proper working condition or diagnose other causes of abnormal operational state data being observed by the sensor devices.

This shared node capabilities provided by embodiments may also provide smart contract functionality. The smart contract functionality may be particularly suited for use cases where interaction between two or more entities supported by the blockchain require trustworthy interaction, such as manufacturing use cases where multiple entities are handling different portions of a process to produce an asset. In such use cases, the involved entities may each perform operations that in the aggregate facilitate production of the asset (e.g., a piece of equipment or machine), use of the asset, or other actions. One reason why trust may be important to such use cases is that in a manufacturing context, each of the entities may operate independently. For example, suppliers may produce parts or components that may be provided to OEMs and the OEMs may then assemble parts or components from multiple suppliers for the asset. While each of the suppliers may contribute parts or components to the OEM, each supplier may operate independently from the others and the OEM. Clients taking possession of the asset from the OEM may also operate independently of the suppliers and the OEM. The ability of blockchain platforms to provide trust between the different entities involved in multiparty use cases, such as manufacturing use cases involving suppliers, OEMs, and clients may represent a significant improvement to industry practices and the technologies used to support those practices. For example, warranty claims may only be covered if specific conditions are complied with, such as operating the asset in accordance with supplier and/or OEM recommended parameters. Blockchain platforms of embodiments may enable data associated with the operational state of the asset, such as maintenance and repairs, to be recorded to the blockchain. Such information may be used to validate warranty claims and ensure that warranty claims are only honored when the asset was used in compliance with the terms of the warranty, which is a capability that existing systems do not provide.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The present disclosure provides systems, methods, and computer-readable storage media for providing shared nodes of a blockchain platform. Embodiments may provide blockchain functionality and services to multiple entities from a single blockchain node, referred to as a shared node, while maintaining security with respect to data recorded to the blockchain. A hash function may be used to generate attributes that can be attached to user identifiers, which allows users to be identified as being associated with a particular entity supported by the blockchain. This capability may enable multiple entities to securely write data to the blockchain from a single node, as well as restrict access to each entity's data. Smart contract functionality may be provided by the shared nodes (and non-shared nodes) of the blockchain platform in use cases where interaction between two or more entities supported by the blockchain require trustworthy functionality. Additional aspects and advantages of shared nodes in accordance with the present disclosure are described more detail below, along with a description of an exemplary use case illustrating some of the advantages that blockchain platforms utilizing shared nodes may provide.

Figure 1:
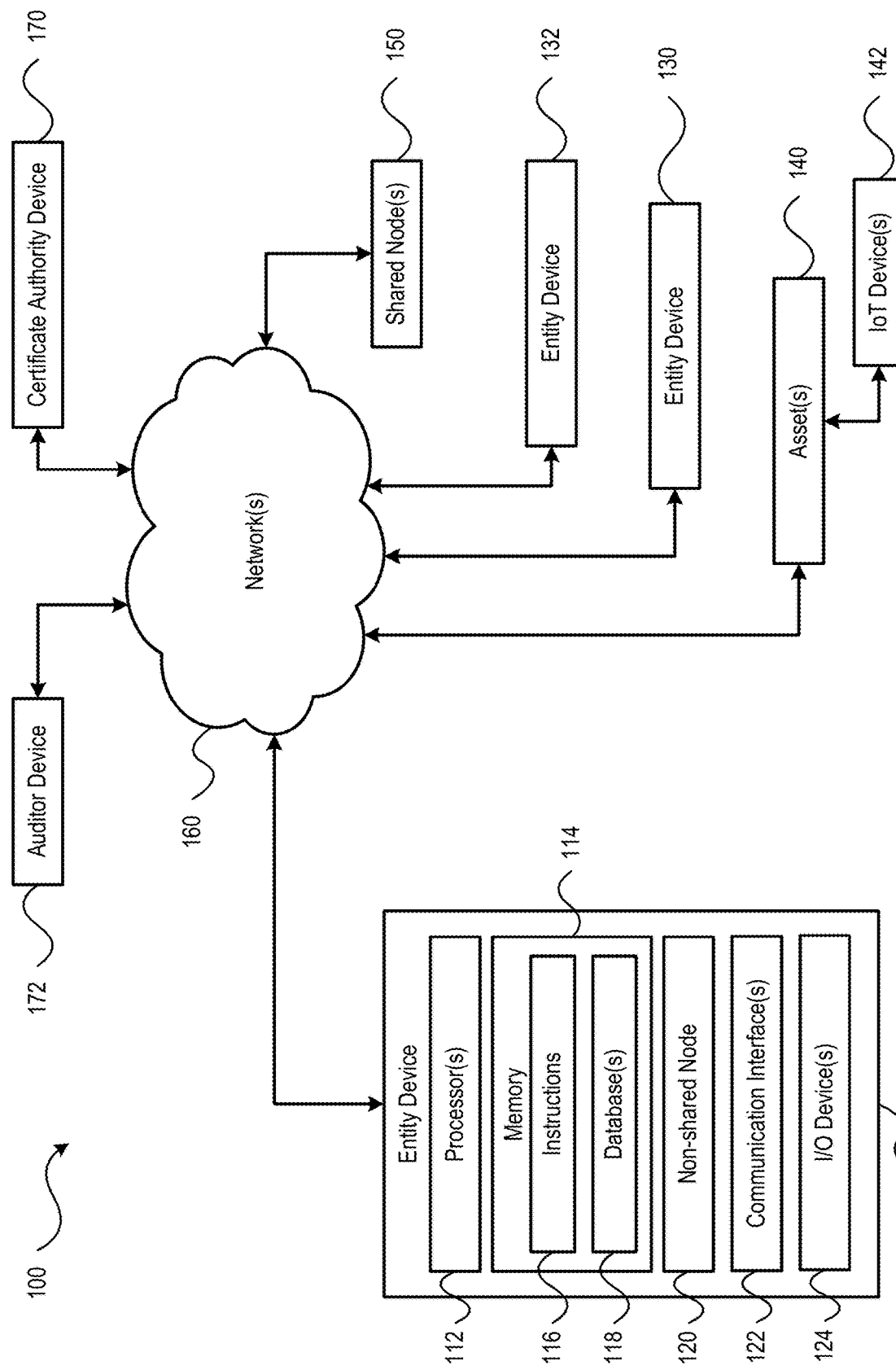
FIG. 1 is a block diagram illustrating a blockchain platform in accordance with aspects of the present disclosure.

Referring to FIG. 1, a block diagram illustrating a blockchain platform in accordance with aspects of the present disclosure is shown as a blockchain platform 100. In FIG. 1, the blockchain platform 100 is shown as including a plurality of entity devices 110, 130, 132. It is noted that FIG. 1 illustrates the blockchain platform 100 as including three entity devices for purposes of illustration and the embodiments of the present disclosure may be implemented with less than three entity devices or more than three entity devices. As illustrated with respect to the entity device 110, entity devices of embodiments may include one or more processors 112, a memory 114, a non-shared node 120, one or more communication interfaces 122, and one or more I/O devices 124. The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the OEM device 110 in accordance with aspects of the present disclosure.

The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the entity device 110 may be stored in the memory 114 as instructions 116 that, when executed by the one or more processors 112, cause the one or more processors 112 to perform the operations described herein with respect to the entity device 110, as described in more detail below. Additionally, the memory 114 may be configured to store information to one or more databases 118. Exemplary aspects of the one or more databases 118 are described in more detail below.

The one or more communication interfaces 122 may be configured to communicatively couple the entity device 110 to external devices and systems via one or more networks 160, such as the other entity devices 130, 132 and nodes of the blockchain platform. Communication between the entity device 110 and the external devices and systems via the one or more networks 160 may be facilitated via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more input/output (I/O) devices 124 may include one or more display devices, a keyboard, a stylus, one or more touchscreens, a mouse, a trackpad, a camera, one or more speakers, haptic feedback devices, or other types of devices that enable a user to receive information from or provide information to the entity device 110, such as information provided or input by a user.

The blockchain platform 100 may be configured to maintain one or more blockchains that record data as blocks on the blockchain. Each block may include a pointer to a previous block of the blockchain, a hash value derived from the previous block, and a data payload comprising the data written to the new block. For example, suppose a blockchain includes 110 blocks and the entity device 110 is writing a new block to the blockchain. The new block would be the $111^{th}$ block and may include a hash value derived from the $110^{th}$ block, a pointer to the $110^{th}$ block, and a data payload that includes new data written to the $111^{th}$ block. The hash value derived from the previous block may be used to validate that the previous block has not been modified (e.g., modification of the $110^{th}$ block's data payload would result in a different hash value than the hash value written to the $111^{th}$ block), thereby enabling detection of data tampering on the blockchain. It is noted that the exemplary block structure and contents described above have been provided for purposes of illustration, rather than by way of limitation and that blockchain platforms according to aspects of the present disclosure may include other block configurations (e.g., additional types of data and mechanisms to record data to blocks of a blockchain).

As shown in FIG. 1, the blockchain(s) provided by the blockchain platform 100 may include a plurality of nodes configured to provide blockchain functionality to the entity devices and other actors involved in a use case to which the blockchain platform 100 may be applied. The nodes of the blockchain platform may include shared and non-shared nodes. For example, FIG. 1 illustrates a non-shared node 120 associated with the entity device 110 and one or more shared nodes 150. The non-shared node 120 may be a node of the blockchain providing blockchain functionality to the entity device 110, such as to allow users of the entity device 110 to record information to blocks of a blockchain provided the blockchain platform 100. As briefly noted above, not every entity may be able to deploy a non-shared node (e.g., due to the technical expertise required and/or cost).

To enable more entities to participate in the blockchain platform 100, a new type of blockchain node may be provided, referred to herein as a shared node. The shared node(s), shown in FIG. 1 as the one or more shared nodes 150, may be nodes providing blockchain functionality to two or more entities' devices, such as the entity devices 130, 132. In aspects, the shared node(s) may be provided by a service provider, such as a service provider that has expertise in blockchain technology and can design and configure blockchain nodes that are provided as part of a service. In additional or alternative aspects, shared nodes may be provided or configured by at least one of the entities participating with the blockchain platform 100 via the shared node. For example, the at least two entities participating with the blockchain platform via a shared node of embodiments may agree to establish a shared node. If one of the at least two entities has expertise for establishing the shared node then that entity may configure the shared node according to the arrangement of the parties and the requirements of the blockchain platform. Establishing shared nodes may increase the ability of entities to participate in blockchain platforms, such as the blockchain platform 100 and ease some of the burdens associated with existing blockchain platforms that require establishment of non-shared nodes by each entity desiring to participate in the blockchain platform 100.

While utilization of shared nodes may increase the ability of entities to participate in blockchain platforms, there are some technical challenges that are created when blockchain nodes are shared. For example, whereas all users of a non-shared node are associated with the entity served by the non-shared node, users may be associated with multiple different entities when shared nodes are utilized. Thus, users of a non-shared node and the data they provide to the shared node may be associated with a single entity based on a user identifier, while shared nodes may be unable to associate data provided by a user with an entity based on just a user identifier. To illustrate, suppose that one of the shared nodes 150 was being shared by entity devices 130, 132. A user associated with the entity device 130 provides data to the shared node. To ensure that the user is not provided with access to data recorded to the shared node by the entity device 132, security measures of the shared node must know that the user is not associated with the entity device 132 and is instead associated with the entity device 130. In aspects, the shared node may be configured to generate identifiers that may be used to associate users with different entities so that access to the blockchain data of a shared node may be provided to each user in accordance with policies and access privileges established on the shared node for the entity associated with the user.

In an aspect, nodes of the blockchain platform may be configured to generate identifiers used to authenticate users and identify their associated entity to enable user access policies and privileges to be implemented by nodes of the blockchain platform. As a non-limiting example, a hash function may be utilized to create identifiers. The hash function may be configured to create identifiers with attributes associating a user identifier with an entity to enable nodes of the blockchain platform 100 to determine users and their associated entities, such as when users are participating in the blockchain platform 100 via the one or more shared nodes 150. Pseudocode for a process for generating user identifiers with attributes that specify the entity the user is associated with is shown below:

```
int hash-id-generator(String S, int M) {
    long sum = 0, mul = 1;
    for (int i = 0; i < s.length( ); i++) {
        if (i % 2 == 0) then mul=1 else mul = mul * 8;
        sum += s.char (i) * mul;
    }
    return (sum % M);
}
```

In exemplary pseudocode above, the function "hash-id-generator" receives two parameters, S and M, as inputs, where S is a string variable initialized with a string representative of the entity associated with the user (e.g., Supplier1) and M is a hash table size (e.g., 100). The output of the function may be an attribute that may be added to (e.g., concatenated with) a user identifier to associate the user with an entity. The hash function may be may be characterized as one or more of the following: one-way, collision resistant, cryptographic, such that attributes generated by the hash function are unique to a particular entity. In an aspect, the hash function may be implemented using the SHA-3 or BLAKE3 algorithms. Associating the user identifier with an entity attribute may enable the blockchain platform, and more specifically a node of the blockchain platform, to associate each user with an entity, thereby enabling nodes to distinguish which entity each of the users accessing the blockchain platform is associated with. This enables various permissions to be implemented by the blockchain platform to ensure that data is written to the blocks of the blockchain in accordance with a configuration of the blockchain platform. For example, the entity associated with entity device 130 may authorize users associated with the entity device 110 to access data recorded to the blockchain via the shared node 150 but not users associated with the entity device 132. If a user associated with the entity device 132 attempts to access the data recorded to the blockchain by the entity device 130, the shared node may check the attribute associated with the user's identifier and determine that the user is associated with the entity 132 and deny access to the data.

In addition to allowing the blockchain platform 100 to control access to data recorded to the blockchain, the user identifiers having attributes associating users with entities may be used to control aspects of how data is written to the blockchain. For example, when a user attempts to write data to the blockchain, the node may determine which entity is associated with the user identifier based on the attribute attached to the user identifier (e.g., via the hash function described above). If the user is associated with the entity device 130, the data may be written to a block associated with the entity device 130, rather than a block associated with the entity device 132 or the entity device 110. In aspects, the data payload or another portion of the block may include information that associates the block with an entity. Such information may be used in connection with the attribute of the user identifier (e.g., the entity identifying attribute) to implement the access controls described above for controlling access to data written to blocks of the blockchain.

In aspects, the user identifiers having attributes associated with the entities corresponding to each user may be generated as a result of a registration process. For example, any single entity may have multiple users that access the blockchain platform 100. As each user is registered with the blockchain platform 100, the above-described hash function may be executed to generate a user identifier for each of the users. In aspects, the registration functionality may be accessed via a web page, an application programming interface (API), or other functionality configured to provide access to the registration functionality. In some aspects, the registration functionality may be provided via a smart contract deployed to the blockchain. For example, a master smart contract may be recorded to a block of the blockchain and an instance of the master smart contract may be invoked by a user to register with the blockchain platform. The master smart contract may include software or executable code consistent with the pseudocode described above to generate user identifiers in accordance with embodiments of the present disclosure. The registration functionality may be configured to capture information from the user to initialize the hash function, such as to receive the user's name, a user identifier (which will be modified to include the attribute generated by the hash function), the name of the entity associated with the user, and other information. In some implementations, the name of the entity may be determined in a different manner, such as by detecting the domain from which the user is accessing the registration functionality or another technique.

In an additional or alternative aspect, registration of users with the blockchain platform 100 may be facilitated by a certificate authority device 170. The certificate authority device 170 may function as a membership services provider (MSP) that manages functionality for registering users with the blockchain platform 100. The certificate authority device 170 may also provide key management functionality for registered users, such as to generate a public-private key pair that may be provided to registered users who may use the private key to sign data submitted to the blockchain platform 100 (e.g., for purposes of authenticating the source of the data using the public key). As another example, the certificate authority device 170 may provide a certificate to a user device (e.g., one of the entity devices 110, 130, 132) and the certificate may include information that may be used to authenticate or validate users when data is written to the blockchain platform. To illustrate, when an entity device submits data with a request that the data be written to the blockchain, the request may include the certificate and the certificate may be validated based on one or more validation criterion, such as based on a comparison of the outcome of the above-described hash function executed with information included in the request to attribute information stored in the certificate. If the outcome and the attribute stored in the certificate match, a smart contract may approve the execution of the chain-code function (e.g., the hash function described above) on the relevant node of the blockchain platform 100 (e.g., the node associated with the entity device submitting the request). In some aspects, the chain-code or hash function used for validating user identities prior to writing data to the blockchain platform may be performed by a smart contract executed on the node receiving the request (e.g., the smart contract is invoked by the node to authenticate the request). In additional or alternative aspects, the smart contract may be executed on a different node (e.g., a node that is different from the node that received the request), such as a node associated with the certificate authority or another node of the blockchain platform trusted to perform authentication of requests to write data to the blockchain platform.

Once registered, the user may be able to read and write data to the blockchain in accordance with any permissions set for the user by the entity associated with the user. In some aspects, the blockchain platform 100 may also provide functionality that enables third parties to view and validate data written to the blockchain platform 100. For example, one or more auditor devices 172 may be provided with access to at least one entity's data, such as to validate test results, sensor data provided by one or more of the IoT devices 142, or other types of data testing and validation. The auditor devices 172 may also be configured to write data to the blockchain platform 100. For example, the auditor device(s) 172 may write data to the blockchain that provides an indication of the validity or test results based on analysis of blockchain data by the auditor device(s) 172. Exemplary aspects of validating blockchain data by an auditor device 172 are described in more detail below with reference to FIG. 2. It is noted that the exemplary operations described above with respect to the auditor device 172 have been provided for purposes of illustration, rather than by way of limitation and that auditor devices utilized with blockchain platforms configured in accordance with embodiments of the present disclosure may perform additional types of data validation and testing operations, as described in more detail below.

The user identifier having the attribute generated by the above-described hash function may also be used to authenticate requests to write data to the blockchain. For example, a user may submit data to the blockchain as part of a request to write data to the blockchain. The request may include the user identifier and attribute, as well as the entity name (e.g., the same name used to generate the attribute), and upon receiving the request, the node (e.g., the non-shared node 120 or one of the shared nodes 150) may execute the hash function to validate the request. The execution of the hash function may be initialized with the entity name and the hash function may generate an outcome that may be compared to the attribute attached to the user identifier. If the outcome matches the attribute, the request may be authorized, resulting in the data being written to a block of the blockchain. The attribute may be recorded to the block along with other data (e.g., a hash value derived from a previous block, a block identifier, a pointer to the previous block, and the data submitted by the user). Including the attribute with the block written to the blockchain may enable access to the block to be controlled in accordance with a set of permissions for the blockchain. For example, a user requesting access to the block from a different entity may be determined to be unauthorized to access the block because the attribute associated with that user's user identifier may not match the attribute recorded to the block. If the attribute of the user requesting access to the block does match, access to the block may be permitted.

In some aspects, the functionality facilitated by the nodes may be leveraged to enable real-time monitoring of assets deployed or utilized by one or more entities participating in the blockchain platform 100. For example, an entity may obtain an asset 140 (e.g., machine, equipment, etc.). The asset 140 may include one or more Internet of things (IoT) devices 142 configured to monitor the asset 140 and record data associated with the asset 140 to the blockchain. The IoT device(s) 142 may include various types of sensors, such as global positioning system (GPS) sensors, temperature sensors, load sensors, pressure sensors, accelerometers, gyroscopes, weight sensors, or other types of sensors configured to generate data representative of state of the asset 140 and its operating environment. The IoT device(s) 142 may include a communication interface, which may be similar to the communication interface(s) 122 that enables the IoT device(s) 142 to continuously or periodically transmit data to a node of the blockchain (e.g., the non-shared node 120 or the shared node 150). It is noted that the frequency of transmission of data by the IoT device(s) 142 may depend on the configuration of the IoT device, the aspect of the asset 140 being monitored, or other factors. For example, if the IoT device(s) 142 is powered by a battery it may transmit data less frequently (e.g., to conserve power) than if the IoT device(s) 142 is connected to a power supply of the asset or other external power source.

As another example, if the temperature of a component of the asset 140 is critical to its functioning, the IoT device 142 may be configured to transmit data representative of the temperature of the component more frequently so that the data recorded to the blockchain provides a real-time or near real-time indication of the operations of the asset 140 and its state. In some aspects, data generated by the IoT devices 142 may only be written to the blockchain platform 100 when it represents a problem condition. For example, the IoT device(s) 142 may include a temperature sensor configured to generate sensor data and the sensor data generated by the temperature sensor may only be written to the blockchain platform 100 when the temperature exceeds (or falls below) a threshold temperature. Only writing data indicative of a problem condition to the blockchain may reduce the number of transactions recorded to the blockchain platform, thereby minimizing the computing resources required by the blockchain platform 100 for executing transactions to record data to the blockchain. It is noted that the exemplary IoT devices described above and their functionality have been described for purposes of illustration, rather than by way of limitation and that other IoT devices and functionality may be readily implemented with blockchain platforms in accordance with aspects of the present disclosure.

As shown above, embodiments of the present disclosure provide a new type of blockchain node, the shared node(s) 150, that may enable entities that would otherwise be unable to participate in a blockchain platform to utilize the benefits of blockchain technology to record, manage, and share data. Additionally, while sharing a blockchain node may create problems with respect to tracking which entity of the multiple entities sharing the shared node are providing data for a specific transaction recorded to the blockchain platform, embodiments of the present disclosure provide techniques (e.g., the above-described hash function for generating user identifier attributes) for differentiating users and entities from each other, thereby allowing multiple entities to share the functionality of a blockchain node without enabling third party entities to spoof or write data to the blockchain that appears to be from one of the multiple entities. It is noted that FIG. 1 provides an overview of the architecture of a blockchain platform in accordance with the present disclosure and that additional details and functionality provided by blockchain platforms of embodiments will become apparent from the exemplary processes and use cases described below.

Figure 2:
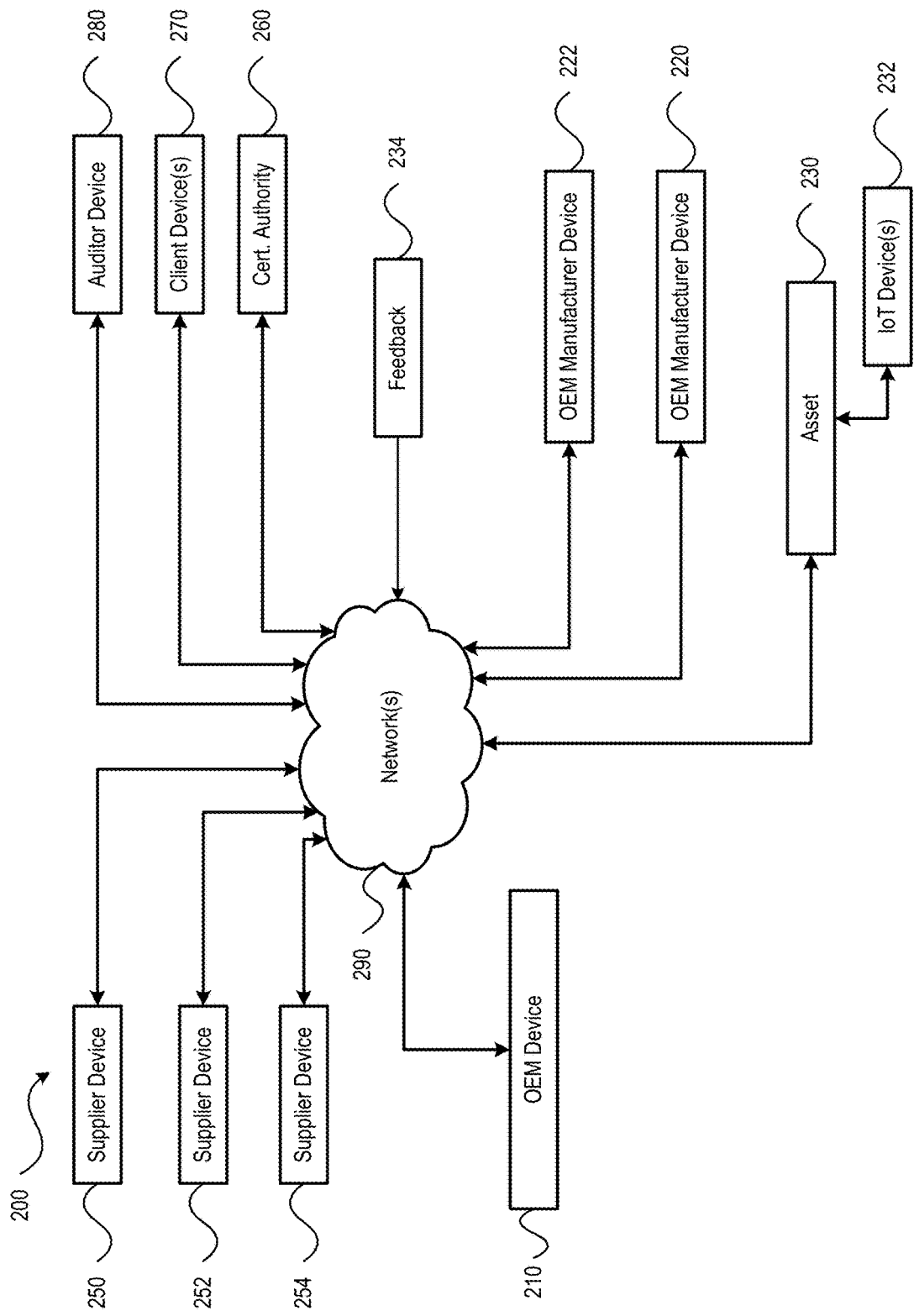
FIG. 2 is a block diagram illustrating additional features of a blockchain platform in accordance with aspects of the present disclosure.

Referring to FIG. 2, a block diagram illustrating exemplary aspects of a blockchain platform for supporting a manufacturing processes is shown as a blockchain platform 200. In FIG. 2, a plurality of devices associated with various entities or actors are shown. These entities include a plurality of OEMs associated with OEM devices 210, 220, 222, suppliers associated with supplier devices 250, 252, 254, a certificate authority 260, one or more clients associated with client device(s) 270, and an auditor associated with auditor device 280. As described above with reference to FIG. 1, each of the OEM devices 210, 220, 222 may be configured to include the various components and functionality described above with reference to the OEM device 110, such as processors, a memory, communication interface(s), and the like. Some of the OEM devices 210, 220, 222, the supplier devices 250, 252, 254, and the client device(s) 270 may be associated with non-shared nodes (e.g., the non-shared node 120 of FIG. 1) of the blockchain platform while others of these devices may be associated with shared nodes (e.g., the shared node(s) 150 of FIG. 1). As illustrated in FIG. 2, the various devices supported by the blockchain platform 200 may be communicatively coupled to each other via one or more networks 290.

Figure 3:
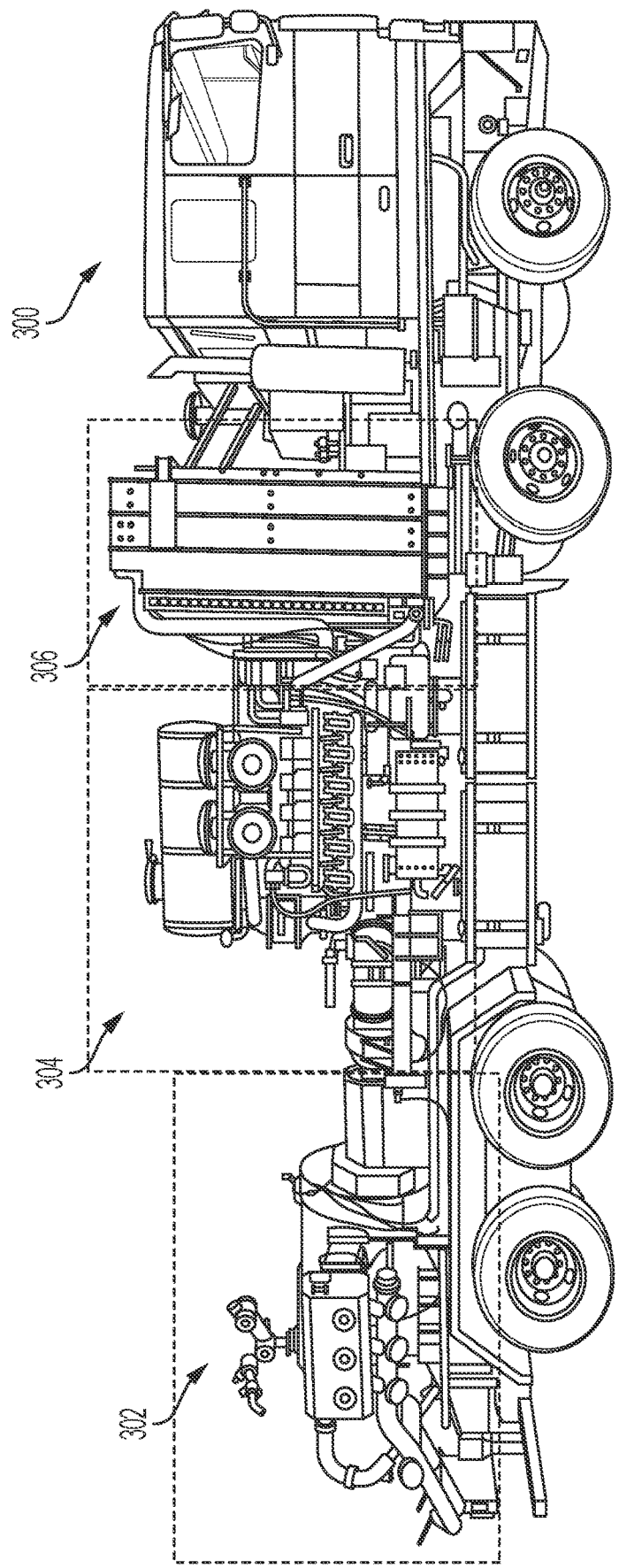
FIG. 3 is an image illustrating exemplary aspects of a use case to which blockchain platforms in accordance with the present disclosure may be applied.

As will be described in more detail below, the supplier entities may manufacture and assemble parts or other components that may be provided to an OEM entity (e.g., one of the entities associated with OEM device 210, 220, or 222. The OEM may then combine parts and components received from one or more suppliers to form a product, a machine or piece of equipment, or other manufactured goods that may be provided to the client. The client may then use the machine, equipment, etc. for various purposes depending on the particular type of machine, equipment, goods, etc. that the OEM has provided to the client. To illustrate and referring briefly to FIG. 3, an image illustrating equipment manufactured in accordance with the techniques described herein is shown as equipment 300. As illustrated in FIG. 3, the equipment 300 may be a fracking truck that includes a pump 302, an engine 304, and a cooling system 306. The pump 302 may be produced by the supplier associated with the supplier device 250, the engine may be produced by the supplier entity associated with supplier device 252, and the cooling system may be produced by the supplier entity associated with the supplier device 254. The pump 302, the engine 304, and the cooling system 306 may be provided to an OEM entities associated with the OEM device 210, the OEM device 220, or the OEM device 222, and the OEM entity may combine the pump 302, the engine 304, and the cooling system 306 with a vehicle to produce the equipment 300. Once manufactured, the OEM may deliver the equipment 300 to a client entity associated with the client device 270 and the client entity may then use the equipment 300 in fracking operations to condition a formation to produce oil or other natural resources.

Referring back to FIG. 2, as each of the different entities (e.g., the supplier entities, the OEM entity, and the client entity) perform the above-described tasks for producing and using the equipment 300 of FIG. 3, information may be recorded to the blockchain platform 200. For example, the supplier producing the pump may record specifications for the pump to the blockchain using the above-described techniques for writing data to the blockchain platform of embodiments. The specifications may include product specifications of the assembly supplied by the supplier, which may include: engine capacity, fuel type, number of cylinders, brake horsepower, oil and coolant details, drive train details, tire requirements, drive train details, details of a drive gear box, cooling system requirements (e.g., cooling systems needs of the pump), etc. In addition to the specifications, the supplier may also write test data to the blockchain platform. The test results may be generated as part of test of the finished assembly and may include information associated with noise levels at idle, 50% of max allowable revolutions per minute (RPMs), max operating speed, braking distances, emission compositions at various RPMs with load and no load, fuel consumption per 100 km or miles travelled with load. The supplier may also write maintenance information to the blockchain platform 200, which may include maintenance data and parameters for the assembly, such as maintenance frequency (e.g., suggested routine maintenance schedule), spares and consumables requirements, conditional maintenance frequency (e.g., maintenance recommended when certain conditions occur), normal and specialized trouble shooting, and the like.

The above-described information may be provided to the blockchain by the supplier producing the pump with a request to record the information to one or more blocks of the blockchain. The request may be transmitted via the one or more networks 290 to a node (e.g., a shared node or a non-shared node) corresponding to the supplier using the techniques described above with reference to FIG. 1. For example, when a request to write the above-described data is transmitted to the blockchain platform 200 by the supplier entity, the request may include information that may be used to authenticate the user identifier based on the attribute generated by the hash function described with reference to FIG. 1. If the authentication of the user is successful, the specifications, test results, and maintenance information may be recorded to one or more blocks of the blockchain by the node receiving the request.

The supplier entity providing the engine may transmit a request to record engine manufacture data to the blockchain platform. The engine manufacture data may include engine production and assembly data, which may include clearance and bore size information, crankshaft/compression ratio/piston data, serial numbers, bearing clearances, actual compression ratio, valve timing details, valve operation angles with respect to crankshaft angles, or other information. The engine supplier may also transmit engine performance data to the blockchain platform 200. The engine performance data may include speed to power variations, exhaust gas compositions, or other information associated with perform of the engine. The engine supplier may also record peak engine performance data to the blockchain, which may include peak performance parameters, idle engine parameters, exhaust gases and variation of exhaust gases with speed and load changes, performance of engine sub-assemblies, vibration versus speed performance, or other types of engine performance metrics.

The above-described engine information may be provided to the blockchain by the engine supplier with a request to record the information to one or more blocks of the blockchain. The request may be transmitted via the one or more networks 290 to a node (e.g., a shared node or a non-shared node) corresponding to the supplier using the techniques described above with reference to FIG. 1. For example, when a request to write the above-described data is transmitted to the blockchain platform 200 by the supplier entity, the request may include information that may be used to authenticate the user identifier based on the attribute generated by the hash function described with reference to FIG. 1. If the authentication of the user is successful, the specifications, test results, and maintenance information may be recorded to one or more blocks of the blockchain by the node receiving the request.

The supplier entity providing the cooling system may transmit a request to record cooling system performance data to the blockchain platform 200. The cooling system performance data may include operational data for the cooling system, such as cooling system performance data, max energy dissipation, calibration details, heat transfer rate, fluid losses if any, information indicating a heat transfer surface area of the cooling system, and unit time for unit heat transfer kilowatt (KW)/Hour. In an aspect, all or a portion of the different types of supplier data described above may be recorded to the blockchain (e.g., via shared and/or non-shared nodes).

The information that identifies the asset, such as an asset identifier that identifies the asset 230 into which the various components are to be incorporated blocks may be recorded to the blockchain. For example, each part or component produced by the suppliers associated with supplier devices 250, 252, 254 may include or be associated with an identifier (e.g., a serial number, a model number, a part number, or other type of information) identifying the part or component. When those parts or components are incorporated into the asset 230, the block(s) recording the structure of the asset 230 may include information that include the identifier for each part or component, the supplier that provided each part or component, the date the part or component was received and/or incorporated (e.g., installed) into the asset 230, other types of information, or combinations of these pieces of information.

As briefly described above, the OEMs may receive parts and components from the suppliers and use the parts and components to assemble a machine or piece of equipment, such as the equipment 300 of FIG. 3, that may be delivered to the client (e.g., the entity that is to take possession of the machine or equipment from the OEM. In FIG. 2, the asset created by the OEM is shown as an asset 230, which may be provided to a client corresponding to one of the client devices 270. During creation or assembly of the asset 230, the OEM may record various types of information to the blockchain platform 200. For example, the OEM may record equipment master data (e.g., specifications for the finally assembled machine or equipment, such as the equipment 300 of FIG. 3) to one or more blocks of the blockchain. The master data may include: asset number, serial number, model number, month and year of production, month and year of testing, production plant ID (e.g., the plant where the equipment was assembled), purchase order (PO) number (e.g., information identifying an order for the machine or equipment from a client), a compression ratio, a pressure ratio, intercooler inlet and outlet temperatures, brake horsepower, max operational speed, max operational temperature, maintenance details, periodic maintenance schedules, list of spares/consumables required for a specific type of maintenance, engine build specification, type of fuel, oil and coolant, ignition and injection timing, sensor positions on all equipments, serial number, make, model, technical specifications of all subassemblies, month and year of manufacture, calibration frequency, or other types of information.

The OEM may also record information identifying ownership and transfer of ownership of the machine or equipment on the blockchain. For example, ownership of the machine or equipment may transfer at the time the machine or equipment is shipped to the client by the OEM, when the OEM takes delivery of the machine or equipment, or at another time (e.g., after the client has inspected the machine or equipment) depending on the arrangement between the OEM and the client. Regardless of the particular mechanisms and timing used to specify when the client takes ownership of the machine or equipment, information indicating the transfer of ownership from the OEM to the client may be recorded to the blockchain. Such information may identify the OEM, the client, data indicating the change ownership for the machine or equipment, a name of the machine or equipment, date information (e.g., a date on which an agreement related to the transfer of ownership is executed, an agreement identifier, a goods, services, and tax number (GST) for the OEM, the client, payment information, performance bond details, a third party auditor agreement, an electronic signature of selling and buying authorities, warranty terms and conditions, other pieces of information, or a combination of these pieces of information.

The OEM may also perform testing of the machine or equipment in its finally assembled form and record the testing to the blockchain. The testing data may include test results obtained from the assembly testing. The testing may include load cycling, speed cycling, thermal shock cycling, component development, vehicle cycle simulation, power curves, governor curves, lubrication and oil consumption, flow measurements, heat balance, emissions measurements, radiographic test results of critical parts, max pressure for cooling systems, results of continuous engine and pump operations, creep and fatigue test data, or other types of tests. Test results recorded to the blockchain by the OEM may include temperature and pressure of air at turbo charger inlet, temperature and pressure of air at turbo charger outlet, turbo RPM versus engine RPMs, turbocharger oil pressure and temperature, or other metrics obtained from the testing.

In an aspect, all or a portion of the testing data recorded to the blockchain platform 200 may be validated by a third party, such as the auditor device 280. For example, the suppliers and the OEM may independently provide testing data to the auditor device 280. The auditor device 280 may be configured to review and verify the testing data and other aspects of the machine or equipment, such as to evaluate safety aspects of the machine or equipment. The auditor device 280 may determine whether the machine or equipment conforms to safety regulations, as well as verify and approve the test results, such as to verify the emissions measurements, radiographic test results of critical parts (e.g., engine flywheel, creep and fatigue test data for engine parts, noise level data, and the like). The auditor device 280 may also analyze or verify operational parameters associated with the machine or equipment, such as to verify operational parameters of the machine or equipment are within defined operational limits or other types of verifications. The auditor device 280 may also verify and approve the tests performed by the OEM, such as to verify and approve load cycling, speed cycling, thermal shock cycling, component development, vehicle cycle simulation, power curves, governor curves, lubrication and oil consumption, flow measurements, heat balance, emissions measurement, radiographic test results of critical parts, max pressure for cooling systems, results of continuous engine and pump operations, creep and fatigue test data, or other types of tests that may be performed by the OEM. In some aspects, the auditors may receive the results of the various tests performed by the OEM and the auditor may then perform independent testing using the same or similar tests and testing conditions and compare the results of the independent tests with the results provided by the OEM to ensure that the two different testing processes produced results that are within a threshold tolerance of each other and applicable limits (e.g., emissions standards, and the like).

Upon completing the verification of the test results, the auditor device 280 may record certification data to the blockchain platform 200. For example, the certification data may identify the machine or equipment and include information that indicates one or more tests that the machine or equipment has passed, such as to indicate the machine or equipment has been certified as compliant with emission standards, etc. If the machine or equipment failed any tests, the certification data may indicate that the machine or equipment is not certified for one or more required or desired certifications and additional testing, tuning, or other operations may be required to obtain certification approval for those tests (and then certification for any failed tests may be performed again). In aspects, the certification data recorded to the blockchain by the auditor device 280 may be accessible to one or more non-auditor entities, such as the OEM, the client, or both.

As briefly described above, the client entity associated with the client device 270 may take possession of the machine or equipment (e.g., the equipment 300 of FIG. 3) from the OEM. Upon taking ownership of the machine or equipment, the client device 270 may record information to the blockchain regarding the ownership transfer. For example, the client device 270 may record information that identifies the client entity, the OEM, the name of the equipment, date of an agreement between the OEM and the client entity, an agreement ID, GST number(s) (e.g., for the OEM and client entity), payment details, performance bond details, an auditor agreement, an electronic signature of the selling and buying authorities (e.g., signatures of the OEM and client entities, which may be generated using private keys provided to each entity by the certificate authority device 260, as described above), warranty terms and conditions, or other information related to the transfer of ownership.

The client device 270 may also record information associated with the machine or equipment, shown in FIG. 2 as the asset 230, to the blockchain. For example, the client device 270 may record information associated with creation of an asset in its books of account (e.g., to indicate the asset 230 is owned by the client entity), information associated with registration of the asset 230 in the client entity's computerized maintenance management (CMMS) system, etc. Such information may include an asset number assigned to the asset 230, a serial number of the asset 230, a model number, a month and year of production, month and year of testing, production plant ID, PO number, compression ratio, pressure ratio, intercooler inlet and outlet temperatures, brake horsepower, max operational speed, max operational temperature, maintenance details, periodic maintenance schedules, list of spares/consumables required for a specific type of maintenance, other types of information, or combinations of the above-described information. In some aspects, the asset 230 may be a component of a larger system and the asset 230 may be installed or integrated with the larger system. In such instances, information associated with installation or integration of the asset with system may be recorded to the blockchain. Additionally, information related to assignment of approved users (e.g., users that are authorized to operate the asset or work on the asset, such as to perform maintenance) and geographical location information associated with the location of the asset 230 may be recorded to the blockchain. When such information is recorded, it may include the asset number, serial number, model number, location, installation date, usage start date, meter readings at installation (e.g., odometer reading, hours of operation meter readings, etc.), geographical coordinates (e.g., latitude and longitude), one more user identifiers (e.g., users that installed the asset 230 or operated the asset 230), custodian information, maintenance crew information, etc.

In addition to recording meter readings at the time when the asset 230 is received and/or installed by the client entity, meter readings/usage readings may be periodically obtained for various components of the asset 230. To facilitate such readings, the asset 230 may include one or more IoT devices 232. As described above, the IoT devices 232 associated with the asset may include sensors configured to detect operating conditions associated with the asset 230, such as the aforementioned readings or other types of information. The frequency with which the measurements by the IoT devices 232 are obtained may vary depending on the particular readings or measurement being obtained. For example, some meter readings may be obtained every few hours (e.g., odometer readings, hour meter readings, etc.) while other readings may be obtained on a higher or lower frequency than every few hours (e.g., instantaneous RPMs of the engine and pump, instantaneous pressure, inlet temperature, coolant outlet temperature, oil temperature, the oil temperature at the cooling inlet and outlet).

In aspects, the client may also record scheduled maintenance information to the blockchain. The scheduled maintenance information may indicate planned maintenance (e.g., preventative maintenance such as regularly scheduled oil changes, tune ups, etc.) as well as maintenance scheduled based on feedback provided by the IoT device(s) 232. For feedback based maintenance, the blockchain platform 200 may be configured to provide functionality for analyzing IoT feedback and initiating various operations based on the outcomes of the analysis. In the present disclosure, such functionality may be referred to as "node red" functionality. In an aspect, the node red functionality may be configured to analyze IoT feedback, shown in FIG. 2 as feedback 234. The node red functionality may analyze the feedback 234 to determine whether the feedback indicates any portions of the asset 230 are being operated in unsafe or harmful conditions, such as exceeding a recommended threshold RPMs, a threshold temperature, a threshold load, or other operational limits of the asset 230. In aspects, the operational limits or thresholds may be derived from information written to the blockchain by the supplier(s) (e.g., the supplier specifications), information written to the blockchain by the OEM (e.g., the OEM specifications), or other information (e.g., information written to the blockchain by the auditors or another entity).

The ability to provide sensor readings related to the operation of the asset 230 in real-time via the IoT devices 232 provides a technological improvement to asset management and monitoring systems by enabling problems that occur to be identified (in real-time or near real-time) based on feedback from the IoT devices 232, which may prevent or minimize damage to the asset 230. For example, if the asset 230 was configured to handle loads of 50 tons and one of the IoT devices 232 detects the asset 230 is being operated at loads in excess of 50 tons, the node red functionality may be used to detect the asset 230 is being operated in excess of recommended limits and generate a notification to the client who may then take action to reduce the load of the asset 230, which may prevent damage to the asset 230 and/or minimize any damage that may have already occurred due to overloading the asset 230. In some aspects, the node red functionality may also be configured to transmit information to the asset 230 itself, such as to transmit a control signal to slow the speed of and/or shut down the asset 230 if unsafe operating conditions are detected, which may prevent further damage to the asset 230 and prevent any delays that may occur if a user (e.g., a maintenance technician) was required to travel to the asset 230 to take action. For example, if the asset 230 is operating at an excessive temperature the node red functionality may transmit a control signal to the asset 230 to slow the asset 230 down, which may help bring the temperature down to normal levels, or even to shut the asset 230 down until the temperature is within appropriate operating levels.

If any operating thresholds are exceeded or other issues are detected, the node red functionality of the blockchain platform 200 may be configured to transmit information to the client device 270, the OEM device corresponding to the OEM that manufactured the asset 230, or other entities. As an example, the node red functionality may detect that a temperature reading detected by one of the IoT devices 232 (e.g., a temperature sensor) is reading temperatures that are outside recommended temperatures for operation of the asset 230. In response to detecting the abnormal temperature reading, the node red functionality may record data to the blockchain associated with a work order to have a technician inspect the asset 230 and the temperature sensor to verify whether the abnormal reading is a result of a faulty sensor or whether it is the result of another problem (e.g., an issue associated with the cooling system or another component of the asset 230). When the work order is completed (e.g., the technician checks the asset 230 to diagnose the cause of the abnormal temperature readings), data may be written to the blockchain (e.g., by the client device 270) that specifies the cause of the temperature readings, any work that was done to correct the issues causing the temperature readings (e.g., replace the sensor, repair the cooling system, and the like).

In aspects, work order information recorded to the blockchain platform 200 may include various types of information, such as a record number, time taken to complete the tasks, technician information, details of spares used/replaced, a work order ID, a start date (e.g., a date when the work associated with the work order was started), an end date (e.g., a data when the work associated with the work order was completed), a duration of time during which the asset 230 was taken out of service to complete the work order, a technician(s) that completed the work associated with the work order, time taken for one or more tasks completed based on the work order, other types of information, or combinations thereof.

Generation of work orders based on the node red functionality described above may be performed via execution of a smart contract of the blockchain platform 200. For example, the node red functionality may be configured to execute a smart contract to generate a work order that includes the relevant details associated with the feedback 234, the asset 230, and other information. Once created, the smart contract may be configured to receive information associated with completion of the work order, such information related to the start and end dates, the technician(s) performing work under the work order, or other portions of the work order information described above.

In some aspects, the feedback data 234 may be provided from the IoT device(s) 232 to an OEM device, such as the OEM device 210 as illustrated in FIG. 2, and the OEM device 210 may record the feedback 234 to the blockchain platform 200 and/or provide the feedback 234 to the node red functionality of the blockchain platform 200. In additional or alternative aspects, the feedback data 234 may be provided to the client device 270. The client device 270 may then invoke the node red functionality and/or provide the feedback 234 to the OEM device 210.

It is noted that while the description above suggests that all feedback 234 is written to the blockchain platform 200, in some aspects feedback may be selectively written to the blockchain. For example, where the node red functionality does not identify any issues based on received feedback, no data may be recorded to the blockchain or a status of "OK" (or some other indication that no problems were found by the node red functionality) may be written to the blockchain platform 200, rather than recording the feedback. In such an implementation, only feedback upon which an issue was detected may be written to the blockchain, which minimizes the size of the blockchain since only feedback data that may negatively impact performance of the asset 230 may be recorded. Minimizing the size of the blockchain may improve the performance of the blockchain platform 200 by eliminating superfluous transactions to record data representative of normal operations of the asset 230. However, it is noted that even in implementations where only problematic feedback data is recorded to the blockchain platform 200, various entities receiving the feedback data may record the non-problematic feedback off-chain (e.g., in one or more local databases of the respective entity devices). For example, in the embodiment illustrated in FIG. 1, the OEM device 110 may receive non-problematic feedback and may record that information to the one or more databases 118. Maintaining records of the non-problematic feedback, whether done on the blockchain platform or off-chain may enable interested parties (e.g., suppliers, OEMs, clients, etc.) to view the history of the asset 230, which may help identify causes of problems that may occur in some situations or enable evaluations to be made as to other factors (e.g., how long should an asset or components of the asset be warrantied, scheduled maintenance effectiveness, etc.).

When repairs are needed with respect to the asset 230, the client device 270 may desire to have the repairs covered under a warranty for the asset 230, which may be a warranty offered by the OEM, the supplier, or a third party. In aspects, the data written to the blockchain may be evaluated to determine whether the repairs are covered under the relevant warranty. For example, the suppliers may provide warranties to the OEM for the various components each supplier providers to the OEM and the OEM may provide a warranty to the client for the asset 230. A client may obtain warranty coverage from the OEM for a particular repair and the OEM may reimbursed or compensated from the supplier if the repair was also covered by the supplier's warranty.

In aspects, warranty claims may be facilitated by smart contracts of the blockchain platform. For example, the suppliers may provide warranty details to the blockchain platform 200 associated with the parts and components each supplier provides to an OEM and the terms of those warranties may be incorporated into a smart contract that may be signed by the supplier and the OEM. Similarly, the OEM may provide warranty details to the blockchain platform 200 associated with the asset 230 provided to the client and the terms of the warranty may be incorporated into a smart contract that may be signed by the client and the OEM. When a warranty repair is performed, the smart contract may be invoked and details related to the cause of the repair, the work performed for the repair, the feedback data (if any) upon which the issue that was repaired was diagnosed, and other information may be evaluated.

If the information satisfies the warranty coverage criteria specified in the smart contract, a warranty claim may be authorized and the repair may be covered under the terms of the relevant warranty. For example, the smart contract may be configured to verify the date on which the feedback data associated with the repair was generated to determine if the asset 230 is still within a coverage period of the warranty. It is noted that warranty coverage criteria may also include other criteria (e.g., other than a time period criterion) and that the time period or coverage period criterion described above has been provided for purposes of illustration, rather than by way of limitation and that other coverage criteria may be utilized (e.g., whether the asset 230 was being utilized under conditions that exceeded the OEM's recommended specifications or the supplier's recommended specifications, whether any parts or components are authentic parts from the supplier instead of third party parts substituted to overcome supply chain delays or for other reasons, whether recommended maintenance schedules were followed or other information related to preventive or corrective maintenance of the asset, etc.). If the warranty claim is between the OEM and the client, the OEM may claw back (or seek reimbursement for) at least a portion of any costs associated with honoring the warranty claim between the client and the OEM based on the warranty provided to the OEM by the supplier. In such instances, similar details to those described above may be provided to the smart contract associated with the supplier's warranty to the OEM and if the warranty covers the repairs, the smart contract may authorize a claim to be issued. When authorized, warranty claims issued by the blockchain platform 200 may be written to the blockchain.

As an illustrative and non-limiting example of warranty-based smart contracts, a smart contract for a pump (e.g., the pump 302 of FIG. 3) may include a set of rules embodied as software that may be executed to evaluate whether a warranty claim for the pump is valid. The rules of the smart contract for the pump may include flow pulsation rules and vibration rules. The flow pulsation rules may be configured to determine if the pressure gauge has a variation of pressure more than X bar (pressure unit) with a frequency greater than Y (number value) in a given period of time T. When a warranty claim is made for the pump, the smart contract may invoked to programmatically determine whether the warranty claim should be authorized based on the set of rules of the smart contract related to the pump. In an aspect, the warranty claim may be subject to critical data review (e.g., if irregularities are identified based on data related to the maintenance and/or operation of the pump via data recorded to the blockchain). The vibration rules of the smart contract may include a vibration rules related to the impeller and vibration rules related to the bearings. The vibration rules related to the impeller may be configured to determine if the pump vibrations at the impeller were observed to be more than X mm/second (millimeter per second) for a continuous or intermittent duration of time T and the vibration rules related to the bearings may be configured to prevent premature failure of the bearings. In an aspect, the vibration rules related to the bearings may specify a time interval for capturing data representative of vibrations at the bearings. When a warranty claim is made, the smart contract may verify that the vibrations at the bearings were measured in accordance with the specified time interval and evaluate the rules related to the vibration of the impeller. If the vibrations are found to be more than X mm/second, the OEM or assembly manufacturer may be contacted and maintenance parameters may be reviewed for any warranty claims to validate the claim.

As another non-limiting example of smart contract-based warranty functionality, a smart contract for a pump (e.g., the pump 302 of FIG. 3) may include a set of rules embodied as software that may be executed to evaluate whether a warranty claim for the engine is valid. The rules of the smart contract for the engine may be configured to analyze whether the engine oil temperature exceeds X ° C. (converted to Y ° F.), determine if the ambient air temperature at the engine intake manifold exceeds X ° C. (converted to Y ° F.), analyze measured vibrations at crankshaft bearings to determine whether the vibrations at the crankshaft bearings exceed X mm/second for a continuous or intermittent duration of time T, and determine if the blow-by pressure goes beyond X bar. In an aspect, maintenance and operations data recorded to the blockchain for T months (or another time interval specified in days, weeks, hours, etc.) prior to the failure may be analyzed by the rules to determine whether a failure of the engine or any of the engine's components (e.g., the intake manifold, the crankshaft bearings, etc.) was the result of improper maintenance or operating conditions (e.g., operating the engine above specified tolerance levels and conditions). In an aspect, all warranty claims with respect to engine may be subject to review of the maintenance and operations data. It is noted that the exemplary smart contract functionality described above with respect to the pump and the engine have been provided for purposes of illustrating aspects of functionality that may be provided by smart-contracts utilized to process warranty claims—however, it is to be understood that smart contracts configured according to the present disclosure may include functionality for facilitating processing or warranty claims that is not specifically described in the non-limiting examples described above.

Utilizing smart contracts and blockchain technology to manage warranty claims for assets in accordance with embodiments of the present disclosure provides several technical advantages over existing practices. For example, existing technology does not allow real-time operating conditions of assets to be determined, which may enable a client to operate an asset in an manner that exceeds recommended operating conditions and then make a warranty claim on the premise that the client was abiding by the recommended specifications. Because the feedback provided by the IoT devices 232 may be generated in real-time or near real-time, actual operating conditions at the time the problem giving rise to a warranty claim occurred may be obtained. This technical capability of blockchain platforms of embodiments may ensure that warranty claims are properly authorized and reduce the number of warranty claims that are honored when they should not have been (e.g., if the client was operating the asset 230 in excess of recommended specifications, etc.).

An additional advantage provided by the blockchain platform 200 is the ability to modify the design of assets. For example, a client may provide a set of requirements to the OEM for an asset and the OEM may work with suppliers to manufacture the asset in accordance with the set of requirements provided by the client. The feedback data generated by the IoT devices embedded within the asset may be used to evaluate whether the set of requirements is sufficient and whether any modifications to the asset or assets manufactured in the future should be made. To illustrate, suppose the set of requirements indicate that the asset should have a particular amount of horsepower, but the feedback data over a period of time indicates that the asset was consistently operated at 20% less horsepower than the particular amount of horsepower included in the set of requirements. Such data may be used to manufacture a newer version of the asset that may utilize a smaller engine, for example, that provides 80-85% of the horsepower of the originally manufactured asset. By utilizing a smaller engine, the overall cost of the asset may be reduced while still providing sufficient capabilities to accomplish the purposes for which the asset was being acquired. As another example, if the feedback indicates that the asset is routinely overheating, it may be determined that a more robust cooling system should be utilized, which may allow the existing asset to be retrofitted with an improved cooling system that eliminates the routine overheating, thereby allowing the asset to stay in service longer and avoid repairs and delays associated with the routine overheating. It is noted that the exemplary modifications based on feedback described above have been provided for purposes of illustration, rather than by way of limitation that the other types of modifications and changes may be made to assets using the feedback-based techniques described herein.

It is noted that while the exemplary use case described above relates to leveraging a blockchain platform configured in accordance with aspects of the present disclosure to facilitate manufacturing and monitoring of assets, such as heavy equipment and machines, embodiments of the present disclosure may also be applied to other use cases. Moreover, it is noted that shared nodes may be utilized in blockchain platforms that do not include certificate authorities or auditors in some applications.

As shown above with reference to FIGS. 1 and 2, blockchain platforms of embodiments provide numerous technical advantages over existing technologies and systems. For example, blockchain platforms of embodiments enable shared nodes to be established that provide secure mechanisms (e.g., user identifiers with attributes and the hash functionality described with reference to FIG. 1) for allowing multiple entities to utilize a single blockchain node while being able to maintain control over data provided to the shared node by each of the multiple entities. Additionally, embodiments enable assets to be configured with embedded IoT devices or other forms of sensors that may provide feedback related to operational conditions of an asset. Node red functionality of blockchain platforms of embodiments may utilize the feedback provided by the IoT devices or sensors to identify problems or other issues that may result in a failure of or damage to the asset and may initiate operations to mitigate those conditions, such to execute a smart contract to initiate a work order to repair or inspect the asset to verify the cause of the problem or issue and even to transmit a control signal to shut down the asset until the cause may be identified or the condition(s) can be mitigated. Additionally, the real-time feedback provided by the IoT devices or sensors may be used to capture the time and other information related to a problem with the asset, which may enable warranty claims to be more reliably evaluated and ensure that warranty claims are not honored when the asset is operated under conditions excluded from warranty coverage.

Figure 4:
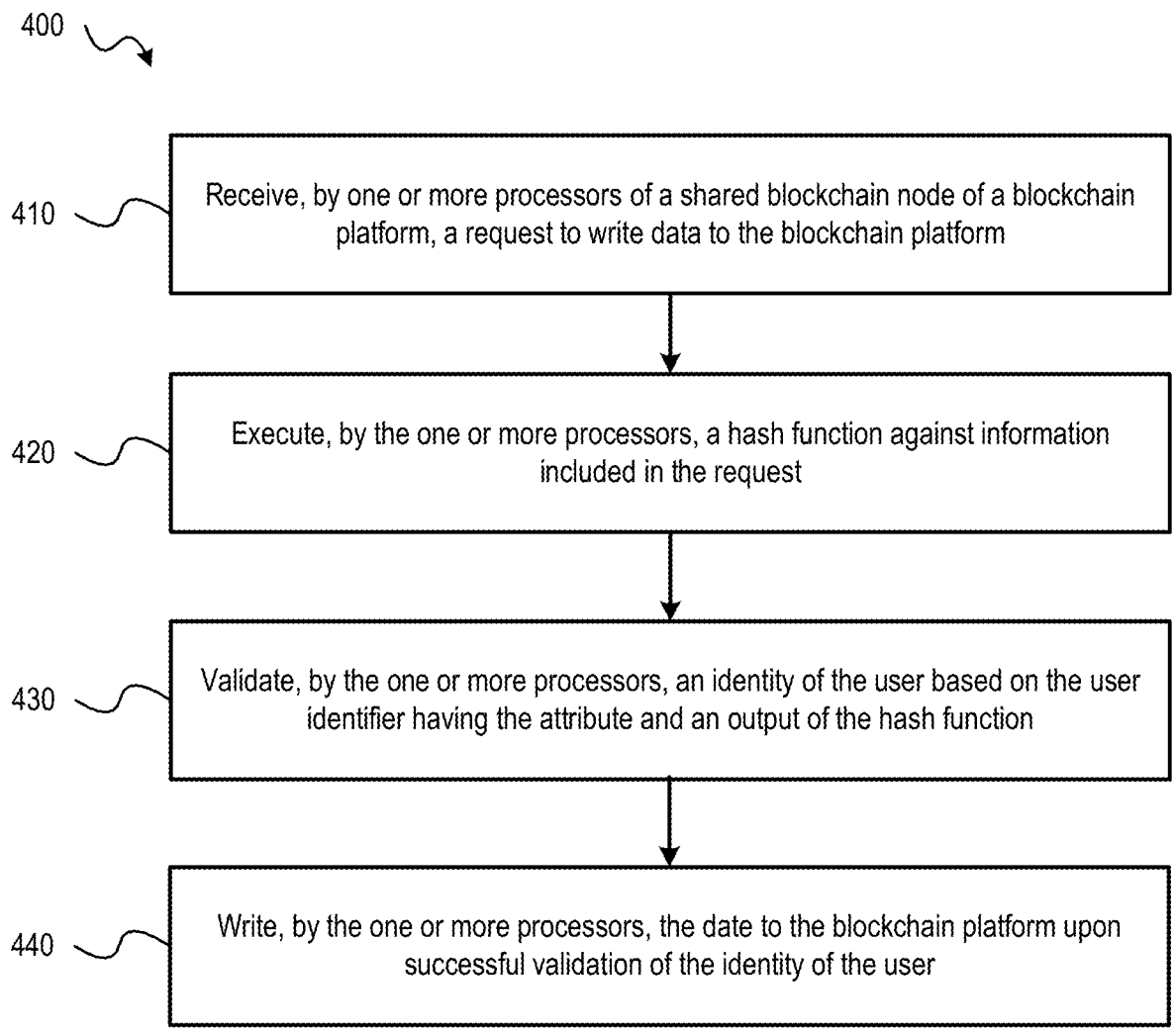
FIG. 4 is a flow diagram illustrating an exemplary method for providing a blockchain platform in accordance with aspects of the present disclosure.

Referring to FIG. 4, a flow diagram illustrating an exemplary method for providing a blockchain platform in accordance with embodiments of the present disclosure is shown as a method 400. In an aspect, the method 400 may be performed by an entity device, such as the entity device 110 of FIG. 1. Steps of the method 400 may be stored as instructions (e.g., the instructions 116 of FIG. 1) that, when executed by one or more processors (e.g., the one or more processors of FIG. 1), cause the one or more processors to perform the steps of the method 400.

At step 410, the method 400 includes receiving, by one or more processors of a shared blockchain node of a blockchain platform, a request to write data to the blockchain platform. As described above, the request may include a user identifier associated with a user and an attribute corresponding to an entity. The attribute attached to the user identity may be generated via a hash function, such the hash function described above with reference to FIG. 1. As described above, blockchain platforms of embodiments may utilize user identities having attributes identifying entities in order to accommodate shared blockchain nodes, which are nodes that multiple different entities may access to interact with and write/read data to/from a blockchain.

At step 420, the method 400 includes executing, by the one or more processors, a hash function against information included in the request. As described above, executing the hash function against information included in the request may enable a shared blockchain node (or a non-shared node) to authenticate users and enforce access rights and permissions of a blockchain that provide security when blockchain nodes are shared among multiple entities. At step 430, the method 400 includes validating, by the one or more processors, an identity of the user based on the user identifier having the attribute and an output of the hash function; and At step 440, the method 400 includes writing, by the one or more processors, the data to the blockchain platform upon successful validation of the identity of the user. For example, if a user submits a request to write data to the blockchain, the hash function may be used to verify the identity of the user and if the user identity is authenticated, the data may be written to a block of the blockchain. The ability to distinguish users and identify their corresponding entities provides functionality that enable users to share nodes of a blockchain platform, since this capability prevents users from passing themselves off as belonging to a different entity participating in the blockchain platform or other types of unscrupulous behavior.

It is noted that the method 400 may include additional operations in some embodiments. For example, the method 400 could include additional data processing functionality, such as feedback-based control of assets, certification and auditing functionality, generation of work orders, warranty claim processing, and other operations described with reference to FIGS. 1 and 2. As described above, aspects of the method 400 may enable blockchain platforms to provide robust functionality that may help widespread adoption of blockchain platforms. For example, blockchain platforms utilizing dedicated or non-shared nodes may prohibit many entities from participating in the blockchain platform due to the costs associated with establishing dedicated or non-shared nodes and/or technical expertise requirements needed to setup and maintain blockchain nodes. In contrast, embodiments of the method 400 enable shared nodes to be utilized by blockchain platforms, which allows multiple entities to share the costs and/or technical challenges associated with setting up and maintaining blockchain nodes, as well as provide more cost effective techniques for service providers to provide blockchain nodes and functionality to entities (e.g., via the cloud or physical hardware or machines). Additionally, the shared nodes may enable trust to be introduced into industries where it currently does not exist or at least does not exist in any tangible form, such as the manufacturing industry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4) may comprise processors, electronics devices, hardware devices, electronics components, logical circuits, memories, software codes, firmware codes, etc., or any combination thereof. In addition, features discussed herein relating to FIGS. 1-4 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within a percentage of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
a shared node of a blockchain platform, wherein the blockchain platform includes shared nodes and non-shared nodes, the shared nodes including the shared node, and wherein the shared node is controlled by a first entity of a plurality of entities participating in the blockchain platform and a second entity of the plurality of entities, the shared node comprising:
a memory; and
one or more processors communicatively coupled to the memory and configured to:
receive a registration request including a user identifier associated with a user and information identifying an entity associated with the user;
generate an attribute based on execution of a hash function against the information identifying the entity associated with the user; and
attach the attribute to the user identifier to produce a shared node user identifier, wherein attaching the attribute to the user identifier comprises combining the attribute with the identifier;
receive a request to write data to the blockchain platform, wherein the request comprises the shared node user identifier and an entity identifier identifying the entity, the shared node user identifier including a first portion that comprises information identifying the user and a second portion that comprises the attribute corresponding to the entity associated with the entity identifier, wherein the entity is one of a plurality of entities supported by the shared node, and wherein the shared node user identifier is associated with the user;
execute the hash function against at least the entity identifier to produce an output;
validate an identity of the user based on a comparison of the attribute and the output of the hash function;
select first policies or access privileges from a plurality of policies or access privileges corresponding to the plurality of entities supported by the shared node based on the entity identifier, wherein the selected first policies or access privileges are specific to the entity identified by the entity identifier; and
write the data to the blockchain platform upon successful validation of the identity of the user and based on the selected first policies or access privileges established for the entity.

2. The shared node of claim 1, the one or more processors configured to:
receive feedback data generated by one or more sensors via a network, the feedback data comprising information representative of a condition of one or more components of an asset; and
determine an operational state of the asset based at least in part on the feedback data.

3. The shared node of claim 2, wherein:
the operational state of the asset is determined based on one or more specifications of the asset, the one or more specifications generated by a manufacturer of the asset, one or more suppliers that provided the one or more components to the manufacturer, or both, and
the plurality of entities supported by the shared node includes the manufacturer and the one or more suppliers.

4. The shared node of claim 2, wherein the asset comprises a machine or equipment.

5. The shared node of claim 4, the one or more processors configured to:
generate a control signal configured to control operations of the asset; and
transmit the control signal to the asset via the network, wherein the control signal is configured to modify operations of the asset to prevent damage to the asset.

6. A method comprising:
receiving a registration request including a user identifier associated with a user and information identifying an entity associated with the user;
generating an attribute based on execution of a hash function against the information identifying the entity associated with the user; and
attaching the attribute to the user identifier to produce a shared node user identifier, wherein attaching the attribute to the user identifier comprises combining the attribute with the identifier;
receiving, by one or more processors of a shared node of a blockchain platform, a request to write data to the blockchain platform, wherein the request comprises the shared node user identifier and an entity identifier, wherein the shared node user identifier is associated with the user and includes a first portion that comprises information identifying the user and a second portion that comprises the attribute corresponding to the entity associated with the entity identifier, and wherein the entity is one of a plurality of entities supported by the shared node;
executing, by the one or more processors, the hash function against at least the entity identifier to produce an output;
validating, by the one or more processors, an identity of the user based on a comparison of the attribute and the output of the hash function;
selecting, by the one or more processors, first policies or access privileges from a plurality of policies or access privileges corresponding to the plurality of entities supported by the shared node based on the entity identifier, wherein the selected first policies or access privileges are specific to the entity identified by the entity identifier; and
writing, by the one or more processors, the data to the blockchain platform upon successful validation of the identity of the user and based on the selected first policies or access privileges established for the entity.

7. The method of claim 6, further comprising:
receiving feedback data generated by one or more sensors via a network,
the feedback data comprising information representative of a condition of one or more components of an asset; and
determining an operational state of the asset based at least in part on the feedback data,
the operational state of the asset is determined based on one or more specifications of the asset, the one or more specifications generated by a manufacturer of the asset, one or more suppliers that provided the one or more components to the manufacturer, or both, and
the plurality of entities supported by the shared node includes the manufacturer and the one or more suppliers.

8. The method of claim 7, further comprising:
generating a control signal configured to control operations of the asset; and
transmitting the control signal to the asset via the network, wherein the control signal is configured to modify operations of the asset to prevent damage to the asset.

9. The method of claim 7, further comprising:
generating a work order, the work order comprising information that identifies one or more issues associated with the asset based on the operational state determined using the feedback data; and
recording the work order to the blockchain platform.

10. The method of claim 7, further comprising:
determining whether a warranty covers one or more repairs resulting from the operational state of the asset;
generating a warranty claim when the one or more repairs are covered by the warranty; and
writing the warranty claim to the blockchain platform.

11. A non-transitory computer-readable storage medium storing instructions that, when executed by one or more processors, cause the one or more processors to perform operations comprising:
receiving a registration request including a user identifier associated with a user and information identifying an entity associated with the user;
generating an attribute based on execution of a hash function against the information identifying the entity associated with the user; and
attaching the attribute to the user identifier to produce a shared node user identifier, wherein attaching the attribute to the user identifier comprises combining the attribute with the identifier;
receiving, at a shared node of a blockchain platform, a request to write data to the blockchain platform, wherein the request comprises the shared node user identifier and an entity identifier, wherein the user identifier is associated with a user and includes a first portion that comprises information identifying a user and a second portion that comprises an attribute corresponding to an entity associated with the entity identifier, and wherein the entity is one of a plurality of entities supported by the shared node;
executing the hash function against at least the entity identifier to produce an output; validating an identity of the user based on a comparison of the attribute and the output of the hash function;
selecting first policies or access privileges from a plurality of policies or access privileges corresponding to the plurality of entities supported by the shared node based on the entity identifier, wherein the selected first policies or access privileges are specific to the entity identified by the entity identifier; and writing the data to the blockchain platform upon successful validation of the identity of the user and based on the selected first policies or access privileges established for the entity.

12. The non-transitory computer-readable storage medium of claim 11, the operations further comprising:

receiving feedback data generated by one or more sensors via a network, the feedback data comprising information representative of a condition of one or more components of an asset; and determining an operational state of the asset based at least in part on the feedback data, the operational state of the asset is determined based on one or more specifications of the asset, the one or more specifications generated by a manufacturer of the asset, one or more suppliers that provided the one or more components to the manufacturer, or both.

13. The non-transitory computer-readable storage medium of claim 12, the operations further comprising:

generating a control signal configured to control operations of the asset; and transmitting the control signal to the asset via the network, wherein the control signal is configured to modify operations of the asset to prevent damage to the asset by reducing a speed of the asset, shutting down one or more components of the asset, or shutting down the asset.

14. The non-transitory computer-readable storage medium of claim 12, the operations further comprising executing a smart contract of the blockchain platform based on the operational state of the asset.

15. The non-transitory computer-readable storage medium of claim 14, wherein the smart contract is configured to generate a work order comprising information that identifies one or more issues associated with the asset based on the operational state determined using the feedback data, record the work order to the blockchain platform, and receive information indicating completion of the work order, wherein the information indicting completion of the work order is recorded to the blockchain platform.

16. The non-transitory computer-readable storage medium of claim 14, wherein the smart contract is configured to:

determine whether a warranty covers one or more repairs resulting from the operational state of the asset;

generate a warranty claim when the one or more repairs are covered by the warranty; and write the warranty claim to the blockchain platform.

17. The shared node of claim 1, wherein attaching the attribute to the user identifier comprises concatenating, to the user identifier, an output of execution of the hash function against the information identifying the entity associated with the user.

18. The method of claim 6, further comprising modifying the data prior to writing the data to the blockchain platform, the modifying configured to reduce a size of data recorded to the blockchain platform.

19. The method of claim 7, further comprising modifying a design of the asset based on the feedback data.

20. The method of claim 9, wherein the work order is generated via a smart contract based on the data written to the blockchain platform.

* * * * *